US008224561B2

(12) United States Patent
Kim et al.

(10) Patent No.: US 8,224,561 B2
(45) Date of Patent: Jul. 17, 2012

(54) SYSTEM FOR ASSISTING FUEL-EFFICIENT DRIVING

(75) Inventors: Dong Sun Kim, Seoul (KR); Dong Jin Shin, Seoul (KR); Sung Yun Kim, Jeju-do (KR); Kyu Ho Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 431 days.

(21) Appl. No.: 12/328,877

(22) Filed: Dec. 5, 2008

(65) Prior Publication Data

US 2009/0281715 A1 Nov. 12, 2009

(30) Foreign Application Priority Data

Dec. 18, 2007 (KR) ........................ 10-2007-0133186

(51) Int. Cl.
*G06F 19/00* (2011.01)

(52) U.S. Cl. ..................................... 701/123; 73/114.53

(58) Field of Classification Search .................. 701/123, 701/29, 51, 54, 70, 79, 439, 104; 73/113, 73/114, 114.52–114.54, 114.42, 114.43, 73/114.47, 114.48, 290; 477/37, 35, 151, 477/168; 340/439, 450.2
See application file for complete search history.

(56) References Cited

U.S. PATENT DOCUMENTS

| | | | | |
|---|---|---|---|---|
| 4,647,902 | A * | 3/1987 | Teshima et al. | 340/439 |
| 5,379,637 | A * | 1/1995 | Abowd et al. | 73/290 R |
| 5,578,748 | A * | 11/1996 | Brehob et al. | 73/114.53 |
| 6,092,021 | A * | 7/2000 | Ehlbeck et al. | 701/123 |
| 6,397,668 | B1 * | 6/2002 | Davison et al. | 73/114.52 |
| 6,453,731 | B1 * | 9/2002 | Yaegashi | 73/114.52 |
| 6,553,301 | B1 * | 4/2003 | Chhaya et al. | 701/54 |
| 7,024,306 | B2 * | 4/2006 | Minami et al. | 701/123 |
| 7,561,954 | B2 * | 7/2009 | Aizawa et al. | 701/79 |
| 7,772,970 | B2 * | 8/2010 | Masuda et al. | 340/439 |
| 2006/0089781 | A1 * | 4/2006 | Sato et al. | 701/103 |
| 2006/0142934 | A1 | 6/2006 | Kim | |
| 2007/0027593 | A1 * | 2/2007 | Shah et al. | 701/30 |
| 2007/0247291 | A1 * | 10/2007 | Masuda et al. | 340/439 |
| 2008/0058159 | A1 * | 3/2008 | Watanabe et al. | 477/156 |

FOREIGN PATENT DOCUMENTS

KR 10-2000-0025188 5/2000

* cited by examiner

*Primary Examiner* — Thomas G. Black
*Assistant Examiner* — Marthe Marc-Coleman
(74) *Attorney, Agent, or Firm* — Edwards Wildman Palmer LLP; Peter F. Corless

(57) ABSTRACT

Disclosed herein is a system for assisting fuel-efficient driving, which can advise a driver to perform fuel-efficient driving by displaying a current fuel economy corresponding to a current driving state on a graph such that a driver can compare the current driving state with a target driving state for achieving an optimum fuel economy of the vehicle.

7 Claims, 6 Drawing Sheets

SYSTEM FOR ASSISTING FUEL-EFFICIENT DRIVING

CROSS-REFERENCE TO RELATED APPLICATIONS

This application claims under 35 U.S.C. §119(a) priority to Korean Application No. 10-2007-0133186, filed on Dec. 18, 2007, the disclosure of which is incorporated herein by reference in its entirety.

BACKGROUND

1. Technical Field

The present invention relates to a system for assisting fuel-efficient driving that assists a driver in achieving optimum fuel economy while driving a vehicle.

2. Related Art

Due to the rise in oil prices and environmental concerns, vehicle manufacturers have conducted intensive researches to improve fuel efficiency of vehicles. Vehicle fuel efficiency depends not only on vehicle engine and transmission tuning technologies but also drivers' driving habits, such as a rapid deceleration habit or a rapid braking habit.

The above information disclosed in this Background section is only for enhancement of understanding of the background of the invention and therefore it may contain information that does not form the prior art that is already known in this country to a person of ordinary skill in the art.

SUMMARY

The present invention provides a system for assisting fuel-efficient driving that can advise a driver to perform fuel-efficient driving by displaying a current fuel economy corresponding to a current driving state on a graph such that a driver can compare the current driving state with a target driving state for achieving an optimum fuel economy of the vehicle.

In accordance with a preferred embodiment of the present invention, the present invention provides a system for assisting fuel-efficient driving, including: a collection unit for collecting driving state information of a vehicle; a storage unit for storing a fuel consumption map over a variety of driving conditions, wherein the fuel consumption map classifies the driving conditions into several groups depending on fuel consumption levels thereof; and a calculation unit for calculating a current fuel consumption level and a target driving condition for achieving an optimal fuel consumption level of the vehicle, based on the information from the collection unit and the fuel consumption map; and a display control unit for graphically displaying the current fuel consumption level and the optimal fuel consumption level on a display such that a driver can compare the current fuel consumption level with the optimal fuel consumption level so as to pursue the target driving condition.

The groups may comprise a low fuel consumption range, a moderate fuel consumption range and a high fuel consumption range. The fuel consumption ranges may be visualized as a graph on the display such that fuel consumption levels in the fuel consumption ranges can be compared with each other. The current fuel consumption level may be displayed on the graph as a pointer and the pointer may move in accordance with changes of the current fuel consumption level responding to acceleration changes of the vehicle.

Regions or width of the fuel consumption ranges in the graph may be changed depending on the current driving state.

The display control unit may further display a current fuel consumption range where the current fuel consumption level is among the fuel consumption ranges.

The calculation unit may periodically store the current fuel consumption range while the driver drives the vehicle and makes a statistical data for the stored current fuel consumption ranges. The display control unit may operate to display this statistical data on the display upon demand from the driver.

The calculation unit may periodically store a current vehicle speed while the driver drives the vehicle and makes a statistical data for the stored current vehicle speeds. The display control unit may operate to display this statistical data on the display upon demand from the driver.

The display control unit may further display whether or not fuel is cut.

The driving state information collected by the collection unit may comprise at least one of a vehicle speed, a brake pedal position value, a TPS value, a transmission gear position, a engine RPM, and whether or not fuel is cut.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, systems for assisting fuel-efficient driving according to preferred embodiments of the present invention will be described in detail with reference to the attached drawings.

Figure 1:
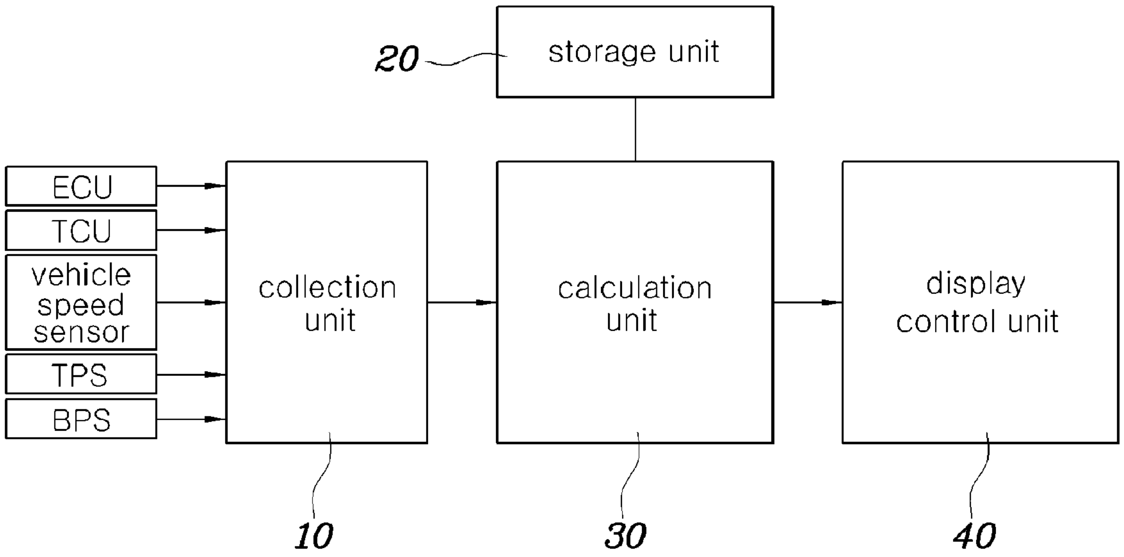
FIG. 1 is a block diagram of a system for assisting fuel-efficient driving according to an embodiment of the present invention.

In an embodiment, as shown in FIG. 1, a system for assisting fuel-efficient driving includes a collection unit 10, a storage unit 20, a calculation unit 30 and a display control unit 40.

The collection unit 10 collects information about current driving state of a vehicle using an engine control unit (ECU), a transmission control unit (TCU), a vehicle speed sensor, a throttle position sensor (TPS) and a brake position sensor (BPS), etc. In particular, information about an engine RPM and whether fuel is cut or not is transmitted from the engine control unit to the collection unit 10, and information about a transmission gear position and whether a damper clutch is in an ON or OFF position is transmitted from the transmission control unit to the collection unit 10.

The storage unit 20 stores therein a fuel consumption map which has data regarding fuel consumption levels over a variety of driving conditions. The fuel consumption map classifies the driving conditions into several groups depending on fuel consumption levels of the driving conditions. The groups comprise a low fuel consumption range, a moderate fuel consumption range and a high fuel consumption range (more details will be described hereafter). Meanwhile, the fuel consumption map can be made based on an engine map or a shift pattern map. The fuel consumption map based on the engine map is now quite well known in this art. With regard to the fuel consumption map based on the shift pattern map, Korean Patent Application No. 2007-0129233 (not published) or other known techniques can be referenced.

The calculation unit calculates a current instantaneous fuel consumption level and a target driving condition for achieving optimal fuel consumption level of the vehicle, based on the information from the collection unit 10 and the fuel consumption map during driving. Also, the calculation unit periodically stores data for a current fuel consumption range and for a current vehicle speed, and statistical data of the stored current fuel consumption ranges and vehicle speeds is displayed by the display control unit 40 (refer to FIG. 3).

The display control unit 40 graphically displays the current fuel consumption level and the optimal fuel consumption level on a display such that a driver can compare the current fuel consumption level with the optimal fuel consumption level so as to pursue the target driving condition. Further, the display control unit 40 may display the fuel consumption ranges in various ways as long as fuel consumption levels in the fuel consumption ranges can be compared with each other. For example, the display control unit 40 may display the fuel consumption ranges as a bar graph 41 on the display such that fuel consumption levels in the fuel consumption ranges can be compared with each other, wherein the current fuel consumption level is displayed on the bar graph 41 as a pointer 42 and the pointer 42 moves in accordance with changes of the current fuel consumption level responding to acceleration changes of the vehicle. The indication of the current fuel consumption level on the bar graph 41 allows the driver to know where the current driving state is among the low fuel consumption range, moderate fuel consumption range, and high fuel consumption range, and to immediately perceive deviation degree of the current driving state from the target (optimal) driving condition.

Figure 2:
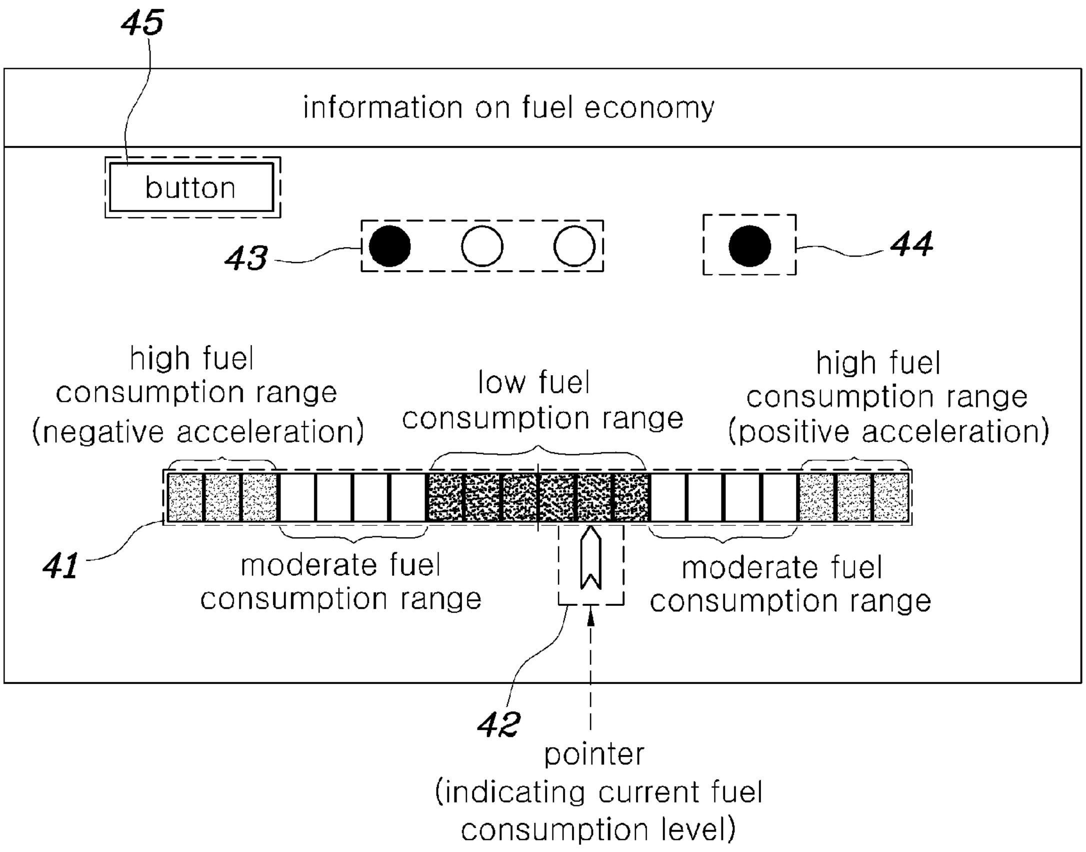
FIG. 2 is a view showing an example of economical driving information displayed according to the present invention.
Figure 3:
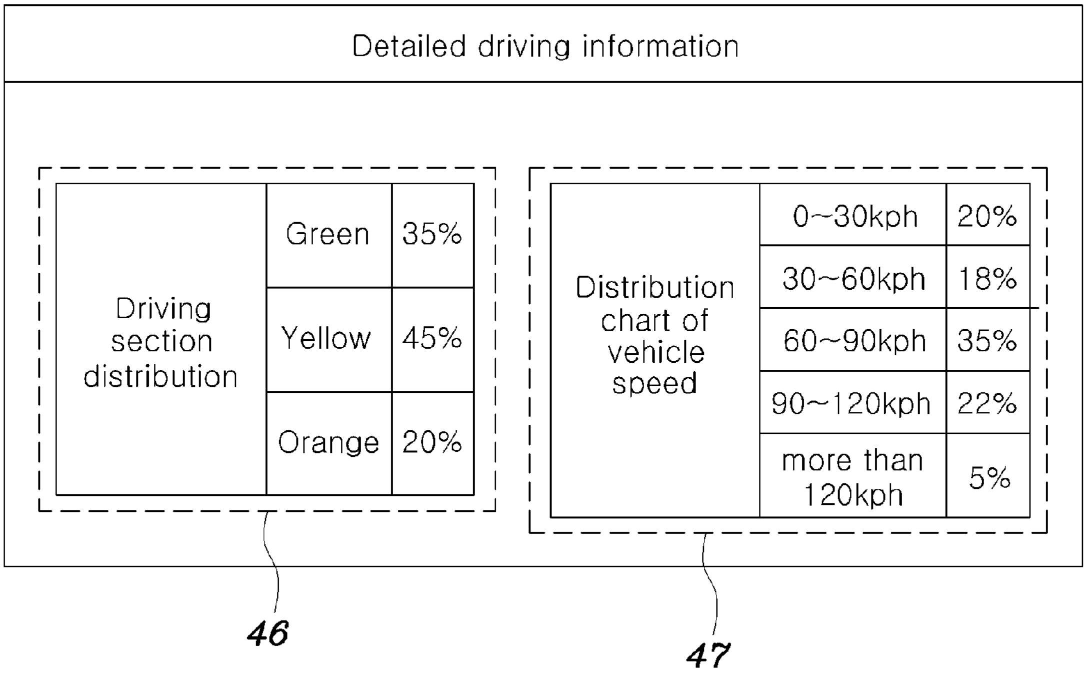
FIG. 3 is a view showing another example of economical driving information displayed according to the present invention.

Referring to FIGS. 2 and 3, information displayed on the display will is explained below.

As shown in FIG. 2, the low fuel consumption range, the moderate fuel consumption range and the high fuel consumption range are displayed on the display as a bar graph 41. The low fuel consumption range (e.g., green) is positioned in a center portion of the bar graph 41. The moderate fuel consumption range (e.g., yellow) and the high fuel consumption range (e.g., orange) are disposed on each of left and right sides of the low fuel consumption range in consideration of positive/negative acceleration of the vehicle. The left side from the low fuel consumption range is for negative acceleration (deceleration) and the right side from the low fuel consumption range is for positive acceleration of the vehicle.

The current fuel consumption level is indicated by the pointer 42 on the bar graph 41. In the case where the driver rapidly accelerates the vehicle more than the current driving state shown in FIG. 2, the pointer 42 moves in the right direction to the moderate fuel consumption range, even to the high fuel consumption range, from the current low fuel consumption range. In contrast, in the case where the vehicle rapidly decelerates, the pointer 42 moves in the left direction to moderate fuel consumption range, even to high fuel consumption range. The driver can, instinctively, discern the current fuel consumption level and adjust the extent to which a brake or accelerator pedal is pressed in order to achieve the optimal fuel consumption level.

Meanwhile, each region, more concretely, referring to FIG. 2, each width of the fuel consumption ranges can vary depending on the current driving state. In the case where a current acceleration rate of the vehicle is extremely high, the pointer 42 moves to far end of the high fuel consumption range. In that case, the width of the high fuel consumption range at the right side of the low fuel consumption range can be increased and the width of the low fuel consumption range can be decreased relatively. Variation of the width of the fuel consumption ranges allows the driver to perceive the current driving state of the vehicle more clearly and to pursue the optimal target driving condition more actively watching the bar graph 41 on the display.

Still referring to FIG. 2, a consumption range indicator 43, a fuel cut indicator 44, or both may be provided on the display. The consumption range indicator 43 shows the current fuel consumption range where the pointer 42 is among the fuel consumption ranges. The driver can easily discern the current driving state. Whether fuel is cut or not is an important factor in improving fuel economy of the vehicle, and it is thus separately displayed on the display. For example, when the vehicle travels downhill, it is recommended to use inertia and gravity rather pressing the accelerator pedal. The fuel cut indicator 44 assists the driver to take his/her foot off accelerator pedal when it is helpful for fuel economy.

A detailed driving information button 45 may be provided on the display as shown in FIG. 2. In this case, a touch screen is used for the display. When the detailed driving information button 45 is pushed, as shown in FIG. 3, detailed driving information is displayed on another window of the display. The detailed driving information comprises distribution chart of fuel consumption which is displayed on a display part for statistical data of fuel consumption 46, and distribution chart of vehicle speed which is displayed on a display part for statistical data of vehicle speed 47. For example, if the detailed driving information, shown in FIG. 3, is results cumulated for one day, it is to be understood that the driver drives in the low fuel consumption range for 45% and vehicle speed from 60 to 90 km/h for 35% of the whole driving time. Using this information, the driver can check his/her driving habits and pursue more economical driving habit.

Figure 4:
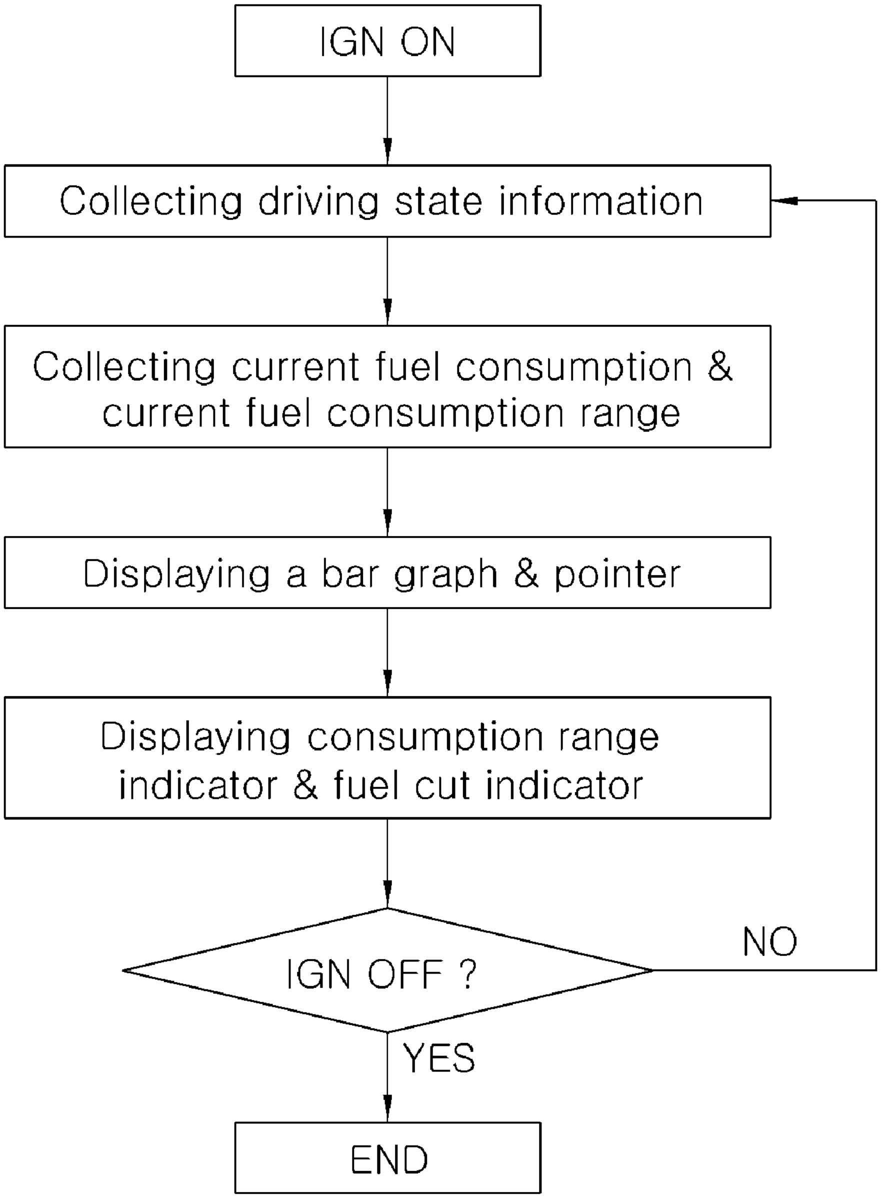
FIG. 4 is a flowchart of the operation of a system for assisting fuel-efficient according to an embodiment of the present invention.

An operation example of the system for assisting fuel-efficient driving will be described with reference to FIGS. 2 and 4.

When ignition is turned on and the vehicle moves, the system starts to collect driving state information and calculates the current instantaneous fuel consumption level and the optimal fuel consumption level to be achieved. And, the system displays on the display the bar graph 41 in which the low/moderate/high fuel consumption ranges are visualized (for instance, they may be visualized in different colors, e.g., green, yellow and orange, respectively). The center portion of the low fuel consumption range corresponds to the target driving condition ensuring the optimal fuel consumption level. The current instantaneous fuel consumption level is indicated by the pointer 42 on the bar graph, and the current fuel consumption range indicator and the fuel cut indicator 44 are also displayed on the display. And, when the ignition is turned off, the system stops its operation.

Another operation example of the system for assisting fuel-efficient driving will be described with reference to FIGS. 3, 5A and 5B.

Figure 5A:
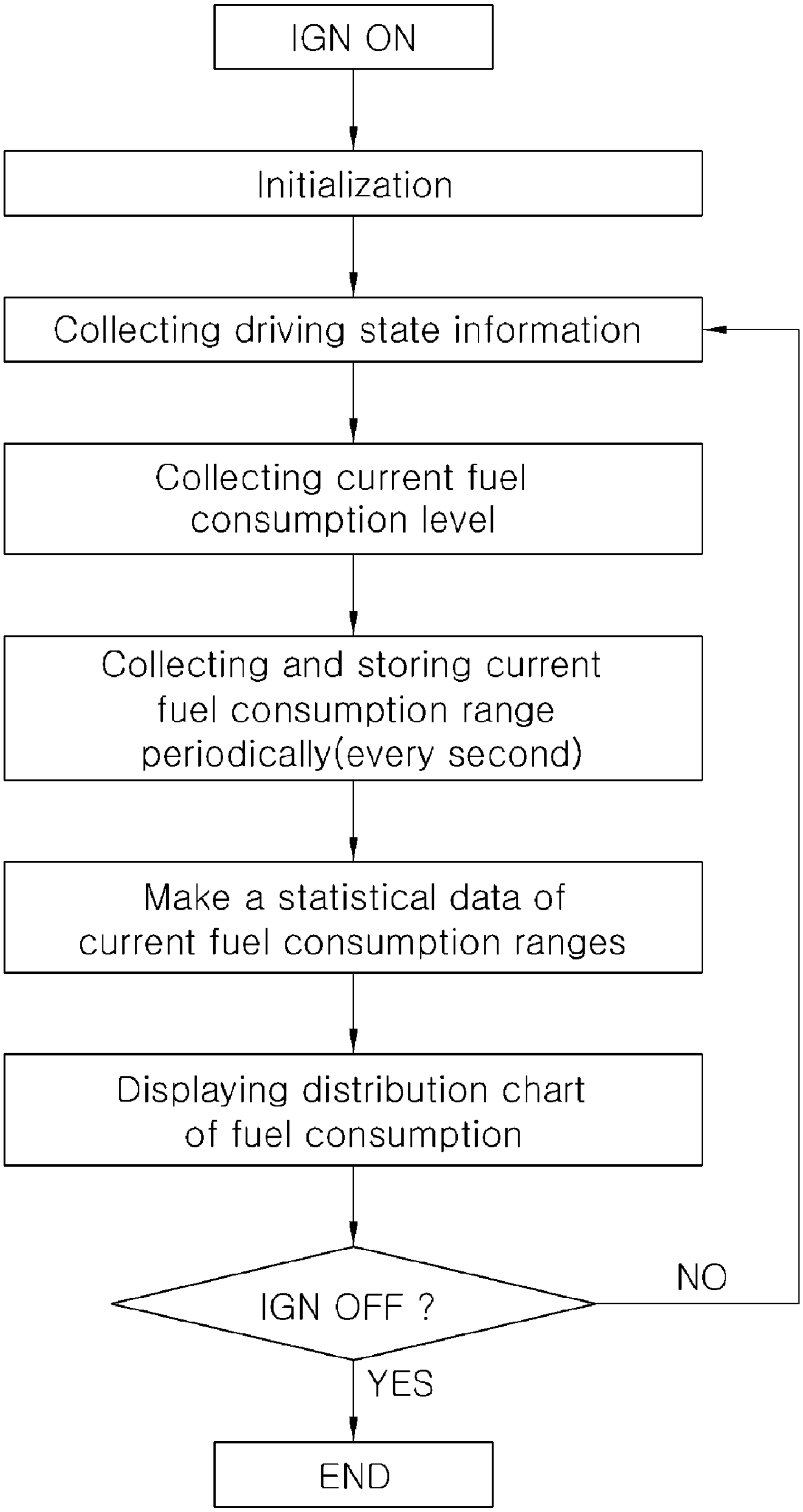
FIGS. 5A and 5B are flowcharts of the operation of a system for assisting fuel-efficient according to an embodiment of the present invention, respectively.

As shown in FIGS. 3 and 5A, when the ignition is turned on, the system initializes data during previous operation. Temporary data only which is used while driving is initialized when newly the ignition is turned on, daily data which is accumulated and analyzed for one day is initialized when date is changed and data optionally accumulated by driver's selection is initialized when an initialization button is activated.

After the initialization, the system collects driving state information, calculates the current fuel consumption level of the vehicle. And then, the system calculates or determines the current fuel consumption range and stores the result data periodically, for example, every second. Based on the result data, the system makes statistical data for the stored current fuel consumption ranges and displays a distribution chart of fuel consumption on the display upon demand by the driver.

Figure 5B:
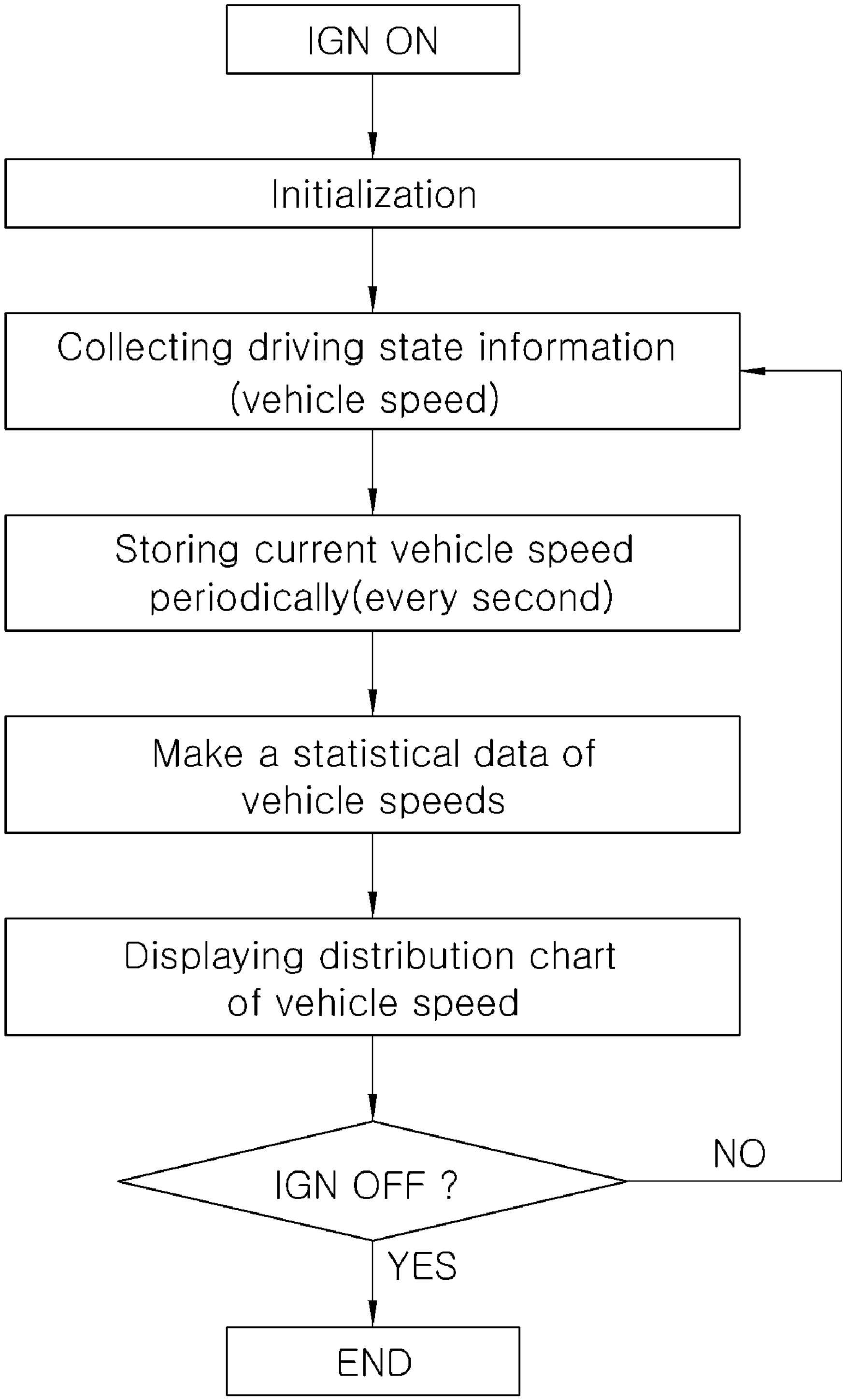

As shown in FIGS. 3 and 5B, when the ignition is turned on, the system initializes data during previous operation as mentioned above. After the initialization, the system collects current vehicle speed and stores data for the current vehicle speed periodically, for example, every second. Based on data, the system makes statistical data for the stored current vehicle speeds and displays a distribution chart of vehicle speed on the display upon demand by the driver.

As described above, in the system for assisting fuel-efficient driving according to the present invention, the current fuel consumption level and the current fuel consumption range are displayed so that a driver can compare them to each other. Furthermore, the system provides other various information related to fuel consumption of the vehicle with the driver, thereby enabling the driver to keep an economical driving habit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for assisting fuel-efficient driving, comprising:

a collection unit for collecting driving state information of a vehicle;

a storage unit for storing a fuel consumption map over a variety of driving conditions, wherein the fuel consumption map classifies the driving conditions into several regions which represent various levels of fuel consumption efficiency; and a calculation unit for calculating a current fuel consumption level and a target driving condition for achieving an optimal fuel consumption level of the vehicle, based on the information from the collection unit 10 and the fuel consumption map; and a display control unit for graphically displaying the current fuel consumption level and the optimal fuel consumption level on a display such that a driver can compare the current fuel consumption level with the optimal fuel consumption level so as to pursue the target driving condition, wherein the several regions which represent various levels of fuel consumption efficiency are displayed on the display unit, each region variably increasing or decreasing width on a bar graph on the display depending on the current driving state of the vehicle.

2. The system for assisting fuel-efficient driving as set forth in claim 1, wherein: the regions comprise a low fuel consumption range, a moderate fuel consumption range and a high fuel consumption range; the fuel consumption ranges are visualized as the bar graph on the display such that fuel consumption levels in the fuel consumption ranges can be compared with each other; and the current fuel consumption level is displayed on the bar graph as a pointer and the pointer moves in accordance with changes of the current fuel consumption level responding to acceleration changes of the vehicle.

3. The system for assisting fuel-efficient driving as set forth in claim 2, wherein the display control unit further displays a current fuel consumption range where the current fuel consumption level is among the fuel consumption ranges.

4. The system for assisting fuel-efficient driving as set forth in claim 2, wherein the calculation unit periodically stores a current fuel consumption range where the current fuel consumption level is among the fuel consumption ranges while the driver drives the vehicle and makes a statistical data for the stored current fuel consumption ranges, and wherein the display control unit is operable to display this statistical data on the display upon demand from the driver.

5. The system for assisting fuel-efficient driving as set forth in claim 2, wherein the calculation unit periodically stores a current vehicle speed while the driver drives the vehicle and makes a statistical data for stored current vehicle speeds, and wherein the display control unit is operable to display this statistical data on the display upon demand from the driver.

6. The system for assisting fuel-efficient driving as set forth in claim 1, wherein the display control unit further displays whether or not fuel is cut.

7. The system for assisting fuel-efficient driving as set forth in claim 1, wherein the driving state information collected by the collection unit 10 comprises at least one of a vehicle speed, a brake pedal position value, a TPS value, a transmission gear position, a engine RPM, and whether or not fuel is cut.

* * * * *